US008014394B2

(12) United States Patent
Ram et al.

(10) Patent No.: US 8,014,394 B2
(45) Date of Patent: Sep. 6, 2011

(54) HIGH-SPEED PROCESSING OF MULTICAST CONTENT REQUESTS

(75) Inventors: Rafi Ram, Herzliya (IL); Ronen Solomon, Ramat Gan (IL)

(73) Assignee: Corrigent Systems Ltd, Tel Aviv (IL)

( * ) Notice: Subject to any disclaimer, the term of this patent is extended or adjusted under 35 U.S.C. 154(b) by 201 days.

(21) Appl. No.: 12/369,011

(22) Filed: Feb. 11, 2009

(65) Prior Publication Data

US 2010/0202452 A1      Aug. 12, 2010

(51) Int. Cl.
  *H04L 12/28*   (2006.01)
  *H04L 12/56*   (2006.01)
  *H04J 3/26*    (2006.01)
(52) U.S. Cl. .................... 370/390; 370/392; 370/432
(58) Field of Classification Search ................. None
  See application file for complete search history.

(56) References Cited

U.S. PATENT DOCUMENTS

| 2002/0191562 | A1  | 12/2002 | Kumaki et al.     |         |
|--------------|-----|---------|-------------------|---------|
| 2002/0191628 | A1* | 12/2002 | Liu et al.        | 370/428 |
| 2006/0146857 | A1* | 7/2006  | Naik et al.       | 370/432 |
| 2006/0268871 | A1  | 11/2006 | Van Zijst         |         |
| 2008/0072035 | A1  | 3/2008  | Johnson et al.    |         |
| 2008/0168118 | A1  | 7/2008  | Hickey et al.     |         |
| 2008/0207137 | A1  | 8/2008  | Maharajh et al.   |         |
| 2009/0290585 | A1* | 11/2009 | Deng              | 370/390 |

OTHER PUBLICATIONS

Deering, S., "Host Extensions for IP Multicasting", RFC 1112, Network Working Group, Internet Engineering Task Force (IETF), Aug. 1989.

Broussard et al., U.S. Appl. No. 12/628,247 "Unicast streaming of multicast content" filed Dec. 1, 2009.

Broussard et al., U.S. Appl. No. 61/119,403 "Unicast Streaming of Multicast Content" filed Dec. 3, 2008.

Fenner, W., "Internet Group Management Protocol", version 2, RFC 2236, Network Working Group, Internet Engineering Task Force (IETF), Nov. 1997.

Cain et al., "Internet Group Management Protocol", version 3, RFC 3376, Network Working Group, Internet Engineering Task Force (IETF), Oct. 2002.

Deering et al., "Multicast Listener Discovery (MLD) for IPv6", RFC 2710, Network Working Group, Internet Engineering Task Force (IETF), Oct. 1999.

Vida et al., "Multicast Listener Discovery Version 2 (MLDv2) for IPv6", RFC 3810, Network Working Group, Internet Engineering Task Force (IETF), Jun. 2004.

(Continued)

*Primary Examiner* — Chirag G Shah
*Assistant Examiner* — Srinivasa R Reddivalam
(74) *Attorney, Agent, or Firm* — Peter A. Nieves; Sheehan Phinney Bass + Green PA

(57) ABSTRACT

A method for communication includes operating a network element, which includes multiple ports and multiple interconnected processing units, such that each processing unit is assigned to process packets that are communicated over a respective set of one or more of the ports. Each processing unit stores a respective list, which indicates one or more multicast packet streams that are permitted for forwarding by the network element, and further indicates a respective subset of the ports over which each of the multicast packet streams is permitted for forwarding. A request relating is disturbed among the multiple processing units, and the respective list in each processing unit is updated responsively to the request. Multicast packets associated with the given multicast packet stream are forwarded selectively by the processing units in accordance with the respective updated lists.

18 Claims, 4 Drawing Sheets

OTHER PUBLICATIONS

Christensen et al., "Considerations for Internet Group Management Protocol (IGMP) and Multicast Listener Discovery (MLD) Snooping Switches", RFC 4541, Network Working Group, Internet Engineering Task Force (IETF), May 2006.

Holbrook et al., "Using Internet Group Management Protocol Version 3 (IGMPv3) and Multicast Listener Discovery Protocol Version 2 (MLDv2) for Source-Specific Multicast", RFC 4604, Network Working Group, Internet Engineering Task Force (IETF), Aug. 2006.

Fenner et al., Internet Group Management Protocol (IGMP) / Multicast Listener Discovery (MLD)-Based Multicast Forwarding ("IGMP/MLD Proxying"), RFC 4605, Network Working Group, Internet Engineering Task Force (IETF), Aug. 2006.

IEEE 802.1AX Standard "IEEE Standard for Local and Metropolitan Area Networks—Link Aggregation", IEEE Computer Society, USA, Nov. 3, 2008.

International Application PCT/IB10/50540 Search Report dated Jul. 13, 2010.

International Application PCT/IB09/55395 Search Report dated Jul. 15, 2010.

* cited by examiner

HIGH-SPEED PROCESSING OF MULTICAST CONTENT REQUESTS

FIELD OF THE INVENTION

The present invention relates generally to communication networks, and particularly to methods and systems for delivering multicast traffic over communication networks.

BACKGROUND OF THE INVENTION

Various communication applications deliver content to multiple recipients over packet networks by transmitting multicast traffic. Applications of this sort include, for example, Internet Protocol Television (IPTV), as well as different applications that provide video and audio content. In order to avoid unnecessary congestion and processing load, it is often desirable not to flood content indiscriminately over the network, but to selectively forward multicast content to the appropriate recipients. A number of communication protocols can be used to introduce such selectivity. Two example protocols that can be used for this purpose are the Internet Group Management Protocol (IGMP) and the Multicast Listener Discovery (MLD) protocols.

IGMP is specified, for example, by Fenner in Request For Comments (RFC) 2236 of the Internet Engineering Task Force (IETF), entitled "Internet Group Management Protocol, Version 2," November, 1997, and by Cain et al. in "Internet Group Management Protocol, Version 3," RFC 3376, October, 2002, which are incorporated herein by reference. MLD is specified, for example, by Deering et al. in "Multicast Listener Discovery (MLD) for IPv6," RFC 2710, October, 1999, and by Vida and Costa in "Multicast Listener Discovery Version 2 (MLDv2) for IPv6," RFC 3810, June, 2004, which are incorporated herein by reference.

Additional aspects of IGMP and MLD are described by Christensen in "Considerations for Internet Group Management Protocol (IGMP) and Multicast Listener Discovery (MLD) Snooping Switches," RFC 4541, May, 2006, by Holbrook et al. in "Using Internet Group Management Protocol Version 3 (IGMPv3) and Multicast Listener Discovery Protocol Version 2 (MLDv2) for Source-Specific Multicast," RFC 4604, August, 2006, and by Fenner et al. in "Internet Group Management Protocol (IGMP)/Multicast Listener Discovery (MLD)-Based Multicast Forwarding ('IGMP/MLD Proxying')," RFC 4605, August, 2006, which are incorporated herein by reference.

SUMMARY OF THE INVENTION

An embodiment of the present invention provides a method for communication, including:

operating a network element, which includes multiple ports and multiple interconnected processing units, such that each processing unit is assigned to process packets that are communicated over a respective set of one or more of the ports;

storing in each processing unit a respective list, which indicates one or more multicast packet streams that are permitted for forwarding by the network element, and further indicates a respective subset of the ports over which each of the multicast packet streams is permitted for forwarding;

receiving from a client a request relating to reception of a given multicast packet stream;

distributing the request among the multiple processing units, and updating the respective list in each processing unit responsively to the request; and selectively forwarding multicast packets associated with the given multicast packet stream by the processing units in accordance with the respective updated lists.

In some embodiments, storing the list, distributing the request and selectively forwarding the multicast packets are performed by dedicated hardware logic. In an embodiment, distributing the request includes duplicating the request to produce first and second copies, forwarding the first copy to a source of the given multicast packet stream, and distributing the second copy among the multiple processing units.

In another embodiment, distributing the request includes distributing among the multiple processing units an identity of an ingress port over which the request was received at the network element, and updating the list includes causing the list to indicate that the given multicast packet stream is permitted for forwarding over the ingress port. In yet another embodiment, updating the list includes modifying the list to indicate that the given multicast packet stream is permitted for forwarding over a given port only when a number of the multicast packet streams that are permitted for forwarding over the given port, including the given multicast packet stream, does not exceed a maximum value specified for the given port.

In some embodiments, operating the network element includes aggregating two or more of the ports to form a high-capacity port. In a disclosed embodiment, aggregating the ports includes setting an upper limit on a number of the multicast packet streams that are permitted for forwarding over the high-capacity port, the request indicates that the given multicast packet stream is to be forwarded over the high-capacity port, and updating the list includes modifying the list to indicate that the given multicast packet stream is permitted for forwarding over the high-capacity port only when the number of the multicast packet streams that are permitted for forwarding over the high-capacity port, including the given multicast packet stream, does not exceed the upper limit. In an embodiment, the ports forming the high-capacity port are assigned to at least two of the processing units, and updating the list includes holding respective local copies of the number of the multicast packet streams that are permitted for forwarding over the high-capacity port, updating the local copies based on the distributed request, and selectively updating the list in each of the at least two processing units based on the respective local copies.

In another embodiment, updating the list includes tracking a use of a permission to forward a certain multicast packet stream over a certain port by monitoring requests relating to the certain multicast packet stream that are received at the network element, and removing the permission from the list responsively to determining that the permission is aged. In yet another embodiment, operating the network element includes initializing a new processing unit added to the network element by:

deactivating the ports to which the new processing unit is assigned;

while the ports to which the new processing unit is assigned are deactivated, sending a multicast status request, receiving multicast membership reports sent by multicast clients in response to the multicast status request, constructing the list by the new processing unit based on the received multicast membership reports; and after constructing the list, activating the ports to which the new processing unit is assigned.

In a disclosed embodiment, the request specifies a requested action selected from a group of actions consisting of receiving the given multicast packet stream and stopping to receive the given multicast packet stream. In an embodiment, the request conforms to one of an Internet Group Management Protocol (IGMP) and a Multicast Listener Discovery (MLD) protocol.

There is additionally provided, in accordance with an embodiment of the present invention, a method for communication, including:

operating first and second network elements for forwarding multicast packet streams, such that during a given time period the first network element serves as an active network element and the second network element serves as backup to the first network element;

during the given time period, updating in the first and second network elements respective first and second lists of one or more of the multicast packet streams that are permitted for forwarding, and selectively forwarding the multicast packet streams by the first network element in accordance with the first list; and in response to an event that causes the first network element to become inactive, replacing the first network element with the second network element as the active network element, and selectively forwarding the multicast packet streams by the second network element in accordance with the second list.

In some embodiments, updating the second list includes receiving at the second network element a request relating to reception of a given multicast packet stream, and updating the second list responsively to the request. In an embodiment, the method includes forwarding the request to a source of the given multicast packet stream, so as to cause the source to forward the given multicast packet stream to the second network element. In some embodiments, the given multicast packet stream is discarded by the second network element during the given time period. In a disclosed embodiment, the request specifies a requested action selected from a group of actions consisting of receiving the given multicast packet stream and stopping to receive the given multicast packet stream. The request may conform to one of an Internet Group Management Protocol (IGMP) and a Multicast Listener Discovery (MLD) protocol.

There is also provided, in accordance with an embodiment of the present invention, a network element, including:

multiple ports; and multiple interconnected processing units, which are configured to process packets that are communicated over respective sets of one or more of the ports, to store respective lists, which indicate one or more multicast packet streams that are permitted for forwarding by the network element and further indicate a respective subset of the ports over which each of the multicast packet streams is permitted for forwarding, to receive from a client a request relating to reception of a given multicast packet stream, and to distribute the request among the processing units so as to update the lists responsively to the distributed request and to selectively forward multicast packets associated with the given multicast packet stream in accordance with the updated lists.

There is further provided, in accordance with an embodiment of the present invention, a network element, including:

one or more ports; and one or more processing units, which are coupled to the ports and are configured to update, during a time period in which the network element serves as backup to another network element serving as an active network element, a list of one or more multicast packet streams that are permitted for forwarding, and, in response to an event that causes the other network element to become inactive, to replace the other network element as the active network element, and to selectively forward the multicast packet streams in accordance with the updated list.

There is additionally provided, in accordance with an embodiment of the present invention, a communication system, including first and second network elements, which are configured to update, during a given time period in which the first network element serves as an active network element and the second network element serves as backup to the first network element, respective first and second lists of one or more multicast packet streams that are permitted for forwarding, to selectively forward the multicast packet streams during the given time period by the first network element in accordance with the first list, and, in response to an event that causes the first network element to become inactive, to replace the first network element with the second network element as the active network element and to selectively forward the multicast packet streams by the second network element in accordance with the second list.

The present invention will be more fully understood from the following detailed description of the embodiments thereof, taken together with the drawings in which:

DETAILED DESCRIPTION OF EMBODIMENTS

Overview

Figure 1:
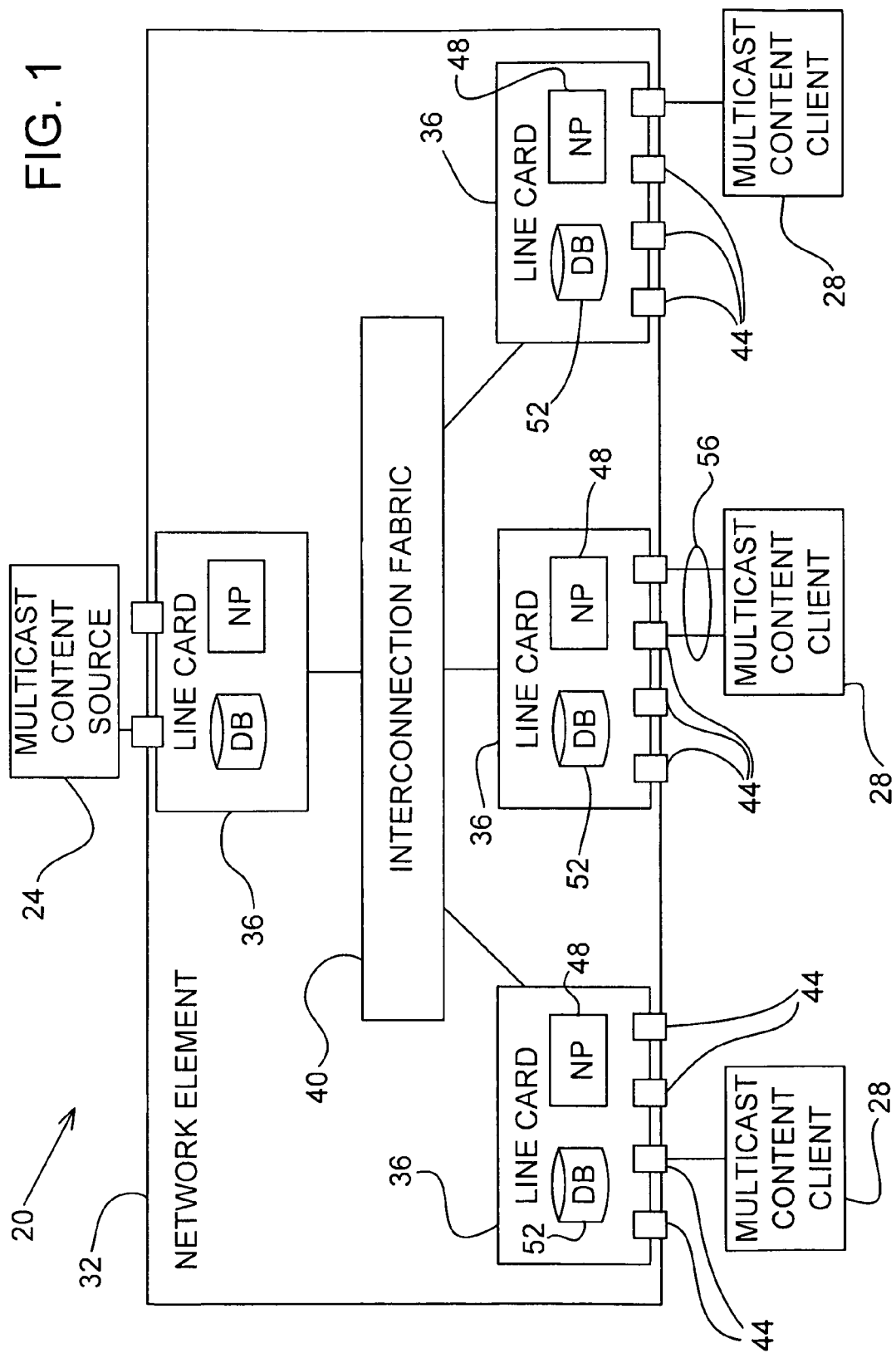
FIG. 1 is a block diagram that schematically illustrates a communication network, in accordance with an embodiment of the present invention.

Some multicast content applications are highly sensitive to the response time to changes in the forwarding configuration. For example, in an Internet Protocol Television (IPTV) application, when a user switches ("zaps") from one television channel to another, the user's set-top box initiates a process of stopping to receive one multicast packet stream and starting to receive another multicast stream. The zapping time, i.e., the time from the moment the user switches the channel in his or her set-top box until the new channel is displayed, is determined by the time needed by the network to apply this forwarding change. Fast zapping time is particularly difficult to achieve when the rate of change requests is high, such as during a commercial break in which a large number of users switch channels almost simultaneously.

Embodiments of the present invention provide improved methods and systems for performing selective multicast forwarding in packet networks. The disclosed methods and systems are particularly effective in adapting rapidly to requests to change the multicast forwarding configuration.

In some embodiments, a network element forwards multicast content requests (e.g., requests to start receiving certain multicast streams or requests to stop receiving certain multicast streams) from multicast clients to multicast sources. The network element comprises multiple processing units (e.g., network processors), which are interconnected by a switch fabric. Each processing unit is assigned to one or more ports of the network element.

Each processing unit comprises a local filtering database, which stores a list of one or more multicast streams that are permitted for forwarding by the network element. The filtering database also stores the identities of the specific ports over which each of the permitted streams is to be forwarded. The processing units forward or discard incoming multicast streams selectively, in accordance with their local filtering databases.

The processing units construct and update their filtering databases by intercepting the multicast content requests sent by the clients. For example, when a given processing unit identifies a multicast content request arriving at one of its ports, the processing unit duplicates the request. One copy of the request is forwarded to the multicast sources. The other copy is distributed among the processing units in the network element (typically including the processing unit that produced the copy). Forwarding and distribution of the duplicate copies may be performed by the processing unit that duplicated the request or by fabric 40. The different processing units update their local filtering databases based on the distributed copy.

When using the methods and systems described herein, multicast forwarding decisions pertaining to a given port are carried out rapidly and locally by the processing unit assigned to the port, using its filtering database. The distributed network element configurations described herein also enable the network element to update its multicast forwarding configuration with minimal latency. In some embodiments, both forwarding decisions and configuration updates are performed using hardware-based mechanisms.

In some embodiments that are described herein, a certain network element is assigned to serve as backup to another network element. When the active network element is operational, the backup network element does not forward multicast streams in order to avoid packet duplication. Nevertheless, the backup network element does not discard multicast content requests received from the multicast clients, but rather forwards the requests to the multicast sources, and also uses the requests to update its filtering databases.

As a result of this process, the filtering databases in the backup network element are constantly kept up-to-date. Therefore, when performing switchover, the backup network element can replace the active network element immediately, without a need to construct its filtering databases from scratch. In addition, since the multicast source already sends the requested multicast content to the backup network element, additional requesting and forwarding delays are eliminated. Because of the short switchover time, disruption of multicast services is minimized.

System Description

FIG. 1 is a block diagram that schematically illustrates a communication network 20, in accordance with an embodiment of the present invention. Network 20 comprises a packet network, such as an Ethernet™ layer-2 switching Internet Protocol (IP) network. At least some of the traffic communicated over network 20 comprises multicast traffic, i.e., streams of multicast packets that are addressed to multiple recipients. In the example of FIG. 1, network 20 comprises a multicast content source 24, which provides multicast content to multicast clients 28 via a network element 32. Source 24 may transmit multicast packet streams that carry, for example, live IP Television (IPTV) channels, video movies, audio content, stock quotes and/or any other suitable type of multicast content.

In the present example, network 20 comprises a single multicast source, three multicast clients and a single network element. This configuration is an example, which is chosen purely for the sake of conceptual clarity. In practice, network 20 may comprise multiple multicast sources, multiple multicast clients and/or multiple network elements. In the example of FIG. 1, the multicast source and the multicast clients are connected directly to the same network element. In a typical implementation, however, the path connecting a given multicast source to a given multicast client will usually traverse multiple network elements.

Multicast sources typically comprise network routers. In an IPTV application, the multicast clients may comprise set-top boxes. Additionally or alternatively, the multicast clients may comprise various sorts of computing platforms, such as desktop computers, laptop, handheld or other mobile computers, Personal Digital Assistants (PDAs), as well as network-enabled mobile telephones or other communication terminals that are able to receive and process multicast content.

Network element 32 comprises multiple processing units, such as line cards 36. The line cards are interconnected by an interconnection switch fabric 40. The network element comprises multiple Input/Output (I/O) ports 44, and each line card 36 is assigned to process the packets communicated over a given subset of the ports. A given line card may handle a single port or multiple ports. Alternatively to using line cards, the network element may comprise any other suitable type of processing units.

Each line card 36 comprises a processor, such as a Network Processor (NP) 48 or a bridging switch, which processes the packets communicated over the ports assigned to the line card using methods that are described herein. Each line card 36 further comprises a filtering database 52, which holds a list of multicast streams that are permitted for forwarding by the network element, as well as additional information related to the forwarding of these streams. The use of databases 52 in forwarding multicast content is addressed in detail below. The term "database" is used herein to describe any suitable data structure that holds the list of permitted multicast streams and the destination ports over which these multicast streams are to be forwarded. Databases 52 may be stored in suitable memory devices of the respective NPs, or in any other suitable memory in the line cards.

In a typical configuration, line cards 36 can be inserted and removed ("hot swapped") while the network element is operational. The modular configuration of network element 32 enables modifying the capacity of the network element in a modular fashion according to demand, and also enables quick and straightforward replacement of faulty components during operation.

Typically, the different components of network element 32, and in particular NPs 48 and fabric 40, are implemented using dedicated hardware logic, such as using suitable Application-Specific Integrated Circuits (ASICs) or Field-Programmable Gate Arrays (FPGAs). Alternatively, however, some network element functions can also be implemented in software, or using a combination of hardware and software elements.

In some embodiments, two or more ports 44 are aggregated to form a high-capacity port 56, in order to provide high traffic capacity and redundancy to a certain content client or content source. For example, ports can be aggregated to form a Link Aggregation Group (LAG), as specified in the IEEE 802.1AX standard, entitled "IEEE Standard for Local and Metropolitan Area Networks—Link Aggregation," Nov. 3, 2008, which is incorporated herein by reference. Each individual port in a LAG is referred to as a group member. A LAG may comprise any desired number of member ports, which may reside in the same line card or in different line cards. Some aspects of forwarding multicast content over aggregated ports are addressed further below.

Selective Forwarding of Multicast Content

In order to avoid unnecessary congestion and processing load, network element 32 forwards multicast streams from source 24 to clients 28 selectively, rather than flooding the multicast traffic indiscriminately to all ports. For this purpose, filtering database 52 in each line card 36 holds a list of multicast streams, which are permitted for forwarding by the network element. In addition, the filtering databases also indicate the specific port or ports to which each permitted multicast stream is to be forwarded. When the network element receives a given multicast stream from source 24, NP 48 in a given line card 36 forwards this stream to the designated ports only if the stream appears in its filtering database. Otherwise, the NP discards the packets associated with the stream. The filtering databases in the different line cards are updated by monitoring request messages, which are sent by the multicast clients in order to start or stop receiving certain multicast content.

Figure 2:
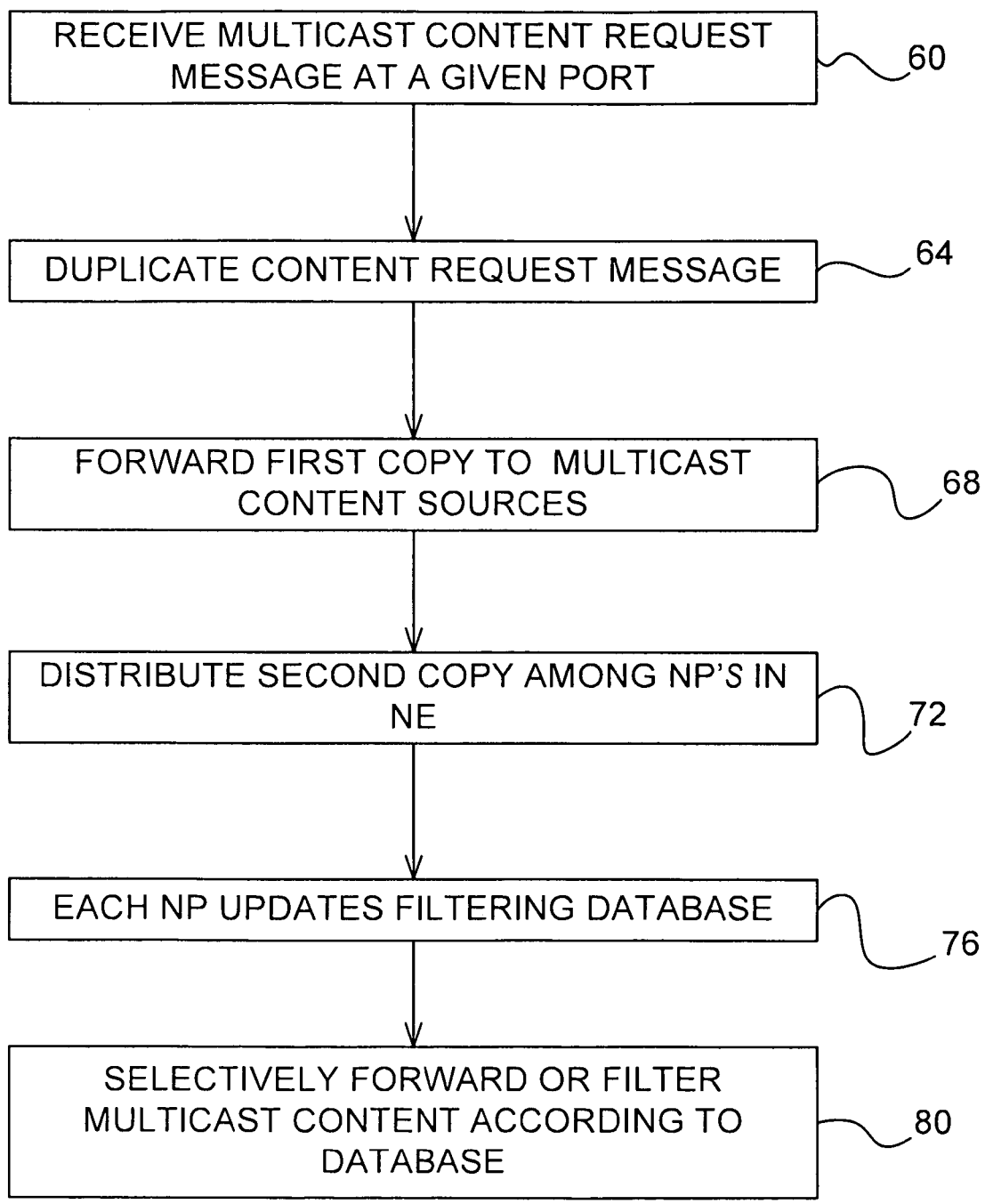
FIG. 2 is a flow chart that schematically illustrates a method for processing multicast content requests in a network element, in accordance with an embodiment of the present invention.

FIG. 2 is a flow chart that schematically illustrates a method for updating databases 52 based on multicast content requests, in accordance with an embodiment of the present invention. The method begins with network element 32 receiving a multicast content request message, at a request reception step 60. Typically, the NPs in the different line cards classify incoming packets, so as to detect multicast content requests. The request is sent from a given multicast client 28, is addressed to a certain multicast source and arrives at one or ports 44 of the network element. The line card at which the request is received is referred to herein as the ingress line card, and the specific port in this line card over which the request arrives is referred to herein as the ingress port.

The multicast content request may comprise, for example, a request to join a certain multicast service (i.e., to start receiving certain multicast content) or to leave a certain multicast service (i.e., to stop receiving certain multicast content). When using IGMP, for example, the request may comprise an IGMP membership report message or an IGMP leave message. For example, in an IPTV application, when a multicast client 28 (e.g., a set-top box) switches ("zaps") from one television channel to another, the client sends a request to stop receiving the content of the previous channel and to start receiving the content of the new channel. In some embodiments, the request conforms to the IGMP or MLD protocols, cited above.

The NP in the ingress line card duplicates the request, at a duplication step 64. The first copy of the request is forwarded to the appropriate multicast sources, at a copy forwarding step 68. In addition, the second copy of the request is forwarded to all the NPs in the network element (including the originating NP), via fabric 40, at a copy distribution step 72. The second copy can be distributed, for example, by sending it in a multicast message addressed to all the NPs of the network element.

The NPs in the line cards of network element 32 receive the distributed copy of the request via fabric 40. Each NP receiving the distributed copy updates its respective database 52 accordingly, at an updating step 76. (The NP that originated the copy also updates its database upon receiving its distributed copy and not based on the initial request.) Typically, the distributed copy of the request further comprises additional information needed by the NPs in order to process the request. In particular, the distributed copy comprises an indication of the ingress port, i.e., the port via which the request arrived at the network element. Each entry in filtering database 52 corresponds to a certain multicast stream, which may be identified, for example, by a unique IGMP multicast group address.

Typically, the filtering databases of the different line cards are initialized so as to discard all multicast content. If the request comprises a request to receive a certain multicast stream, the NPs update their filtering databases to permit forwarding of the requested multicast stream. The permission is typically granted on a port-by-port basis. In other words, if the request arrived over a certain ingress port, then NPs conclude that the multicast client that sent the request is reachable via this port. Therefore, the NPs update their filtering databases to permit forwarding of the requested multicast stream to this specific port. Note that a given multicast stream may be permitted for forwarding to multiple ports, for example as a result of multiple requests for the same multicast content, which arrived from multiple clients over different ingress ports. If the request comprises a request to stop receiving a certain multicast stream, the NPs remove the corresponding entry from their filtering databases.

The network element selectively forwards incoming multicast streams in accordance with the updated filtering databases, at a selective forwarding step 80. Selective forwarding is carried out in a distributed manner by the different NPs in line cards 36. When a given NP 48 in a given line card 36 receives packets that are associated with a given multicast stream, the NP looks for a matching entry in its filtering database. If the database indicates that the multicast stream in question is permitted for forwarding to one or more ports, the NP forwards the packets associated with this stream to the permitted ports. Otherwise, the NP discards the packets.

In some embodiments, the network element allows only a limited number of multicast streams to be forwarded over any given port, so as not to exceed the maximum bandwidths of the ports. For example, a maximum allowed number of multicast streams may be set to each port. This maximum number may be the same for all ports or different for different ports. In these embodiments, filtering databases 52 hold port counters, which are indicative of the number of multicast streams that are permitted for forwarding over each port (or of the number of additional streams that the port can still support).

During operation, new multicast content may be requested by clients, and other content may be terminated. The NPs keep track of these changes by monitoring the multicast content request messages (e.g., IGMP membership reports and leave messages), and update the port counters accordingly. Typically, the port counter of a given port is initialized to the maximum allowed number of ports. The counter is decremented when a new multicast stream is permitted for forwarding to the port, and is incremented when an existing multicast stream is removed from the port. Thus, a port counter that is equal to zero indicates that the maximum allowed number of streams have already been permitted for this port. Alternatively, any other suitable counter management logic can also be used.

In some embodiments, when the network element receives a request for a new multicast stream, the NP of the ingress line card checks whether the ingress port can support this additional stream. For example, the NP may query the port counter of the ingress port, which is stored in database 52 of the ingress card, and check whether the current number of multicast streams permitted for forwarding over the ingress port has reached the maximum allowed number for that port.

If the maximum number of streams has already been exhausted, the NP of the ingress card does not duplicate the request and does not distribute it among the NPs. As a result, the new multicast stream will be denied.

Thus, in a typical implementation, the NP of the ingress card duplicates and distributes a given multicast content request if one of the following conditions is met: (1) the request comprises a request to stop receiving a certain multicast stream, (2) the port counter of the ingress port indicates that the maximum allowed number of multicast streams is not yet exhausted, or (3) the request corresponds to a multicast stream that is already permitted.

When the NP in a given line card receives a duplicated and distributed copy of a multicast content request from another NP, the receiving NP checks whether the request comprises a request to join a multicast stream that is not currently permitted for the reported ingress port. If so, the receiving NP adds an appropriate entry to its database 52, and updates the port counter of the ingress port. If the request comprises a request to leave a certain multicast stream, and the stream is currently permitted for the reported ingress port, the NP removes the entry of this stream from its database 52 and updates the ingress port counter.

In some embodiments, network element 32 runs an aging process, which retains only multicast stream memberships that are refreshed from time to time, and removes old memberships that are no longer active. For example, databases 52 may hold aging counters for the different multicast streams and ports. A given aging counter keeps track of a membership of a particular port in a particular multicast stream. A given NP typically resets the aging counter the corresponding port initially joins the stream (i.e., when the stream is initially permitted for forwarding to this port) and upon receiving additional requests (aging refresh messages) for a membership that already exists. Typically, each NP scans its filtering database occasionally, checks the aging counters, and removes old entries that were not refreshed recently. When removing an aged entry, the NP typically updates the port counter so that an additional stream may be permitted instead of the aged stream.

When a new line card is inserted into an active network element, the NP of the new line card runs a process that updates its filtering database. Typically, the NP of the new line card disables its local ports 44 for a certain period of time (e.g., by setting the ADMIN_STATUS of these ports to DOWN), during which a multicast status update request (e.g., an IGMP general query) is transmitted through all the ports of the network element. The multicast content clients respond to the status update request, thus allowing the newly-added NP to update its local filtering database, port counters and aging counters. When the database and counters are up-to-date (or after a certain time out), the NP activates the ports of the newly-inserted line card, and may start normal operation.

As noted above, two or more ports 44 may be aggregated to form a LAG, and this LAG may comprise member ports that reside in different line cards. Typically, when a given multicast content request is received from a multicast client over a certain LAG member, the requested multicast stream will be forwarded to this client over the same member port. Similarly, when a multicast content request is forwarded to a multicast source over a certain LAG member, the requested multicast stream will be received from the multicast source over this member.

Typically, the total number of multicast streams forwarded over the entire LAG is limited. For this purpose, the network element maintains a counter that limits the number of multicast streams that are permitted for forwarding over the LAG.

As noted above, member ports of a given LAG may reside in different line cards. In these embodiments, the different NPs in the line cards that host the different LAG members hold respective local copies of the LAG's limit counter. When one of these NPs receives a multicast content request, the request typically identifies the entire LAG (and not the individual member over which it arrived) as the ingress port. The receiving NP duplicates the request and distributes one copy to all NPs, as described above. In particular, the NPs that host the different LAG members receive the distributed copy, and update their local copies of the LAG limit counter accordingly. This mechanism allows the NPs to manage local copies of the LAG limit counter without a need for additional communication or synchronization among the LAG members.

Network Element Protection Schemes

In some network configurations, a certain network element is assigned to protect another network element against failures or other events. As long as protected network element is active, the backup network element does not forward traffic. In case of failure of the protected network element or other triggering event, the backup network element takes over the active role and begins to forward traffic instead of the protected network element.

Figure 3:
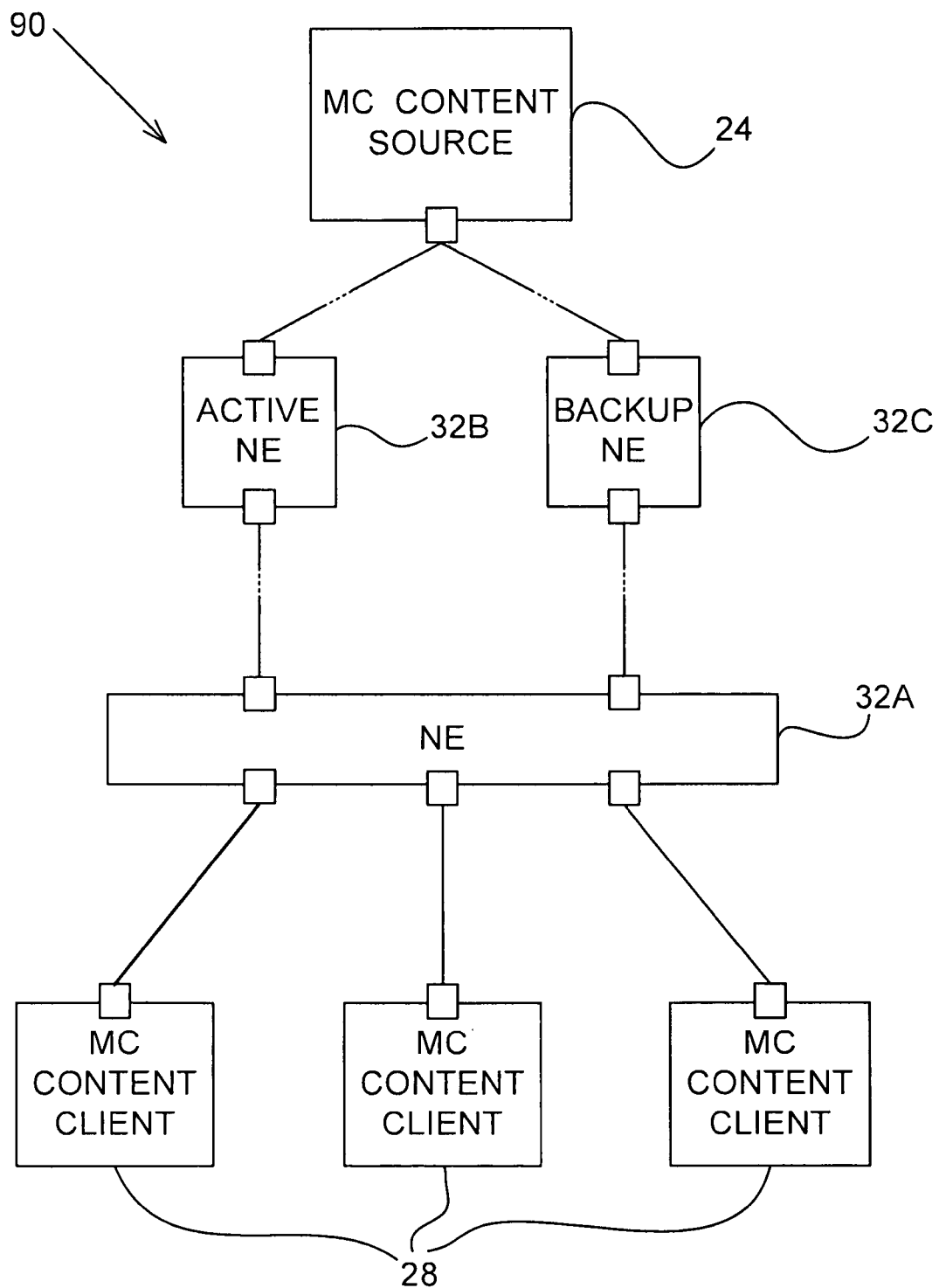
FIG. 3 is a block diagram that schematically illustrates network elements in a protection configuration, in accordance with an embodiment of the present invention.

FIG. 3 is a block diagram that schematically illustrates network elements in a protection configuration, in accordance with an embodiment of the present invention. FIG. 3 shows a network 90, which comprises a multicast source that provides multicast content to three multicast clients 28. The example network comprises network elements 32A . . . 32C. Each of these network elements is similar in structure and functionality to network element 32 of FIG. 1 above.

Network element 32C is assigned to protect network element 32B. In other words, network element 32B is normally active and forwards multicast content using the methods described above. Network element 32C serves as backup to network element 32B, and takes over full forwarding functionality upon failure of network element 32B or other triggering event.

Network element 32C has two operational modes, an active mode and a backup mode. In the active mode, network element 32C forwards multicast content using the methods described above. When in the backup mode, network element 32C does not forward multicast streams in order to avoid packet duplication. Nevertheless, network element 32C performs certain forwarding functions when in the backup mode, in order to maintain filtering databases 52 of its line cards 36 up-to-date. An example process of this sort is described in FIG. 4 below.

As a result, when network element 32C switches-over to replace network element 32B, the filtering databases in network element 32C are already up-to-date and the network element can begin normal operation immediately. Since the multicast source forwards the requested multicast content to both the active and backup NEs, and since the on-going updating of the filtering databases of the backup network element considerably shortens the switchover time, multicast service disruption is minimal.

Figure 4:
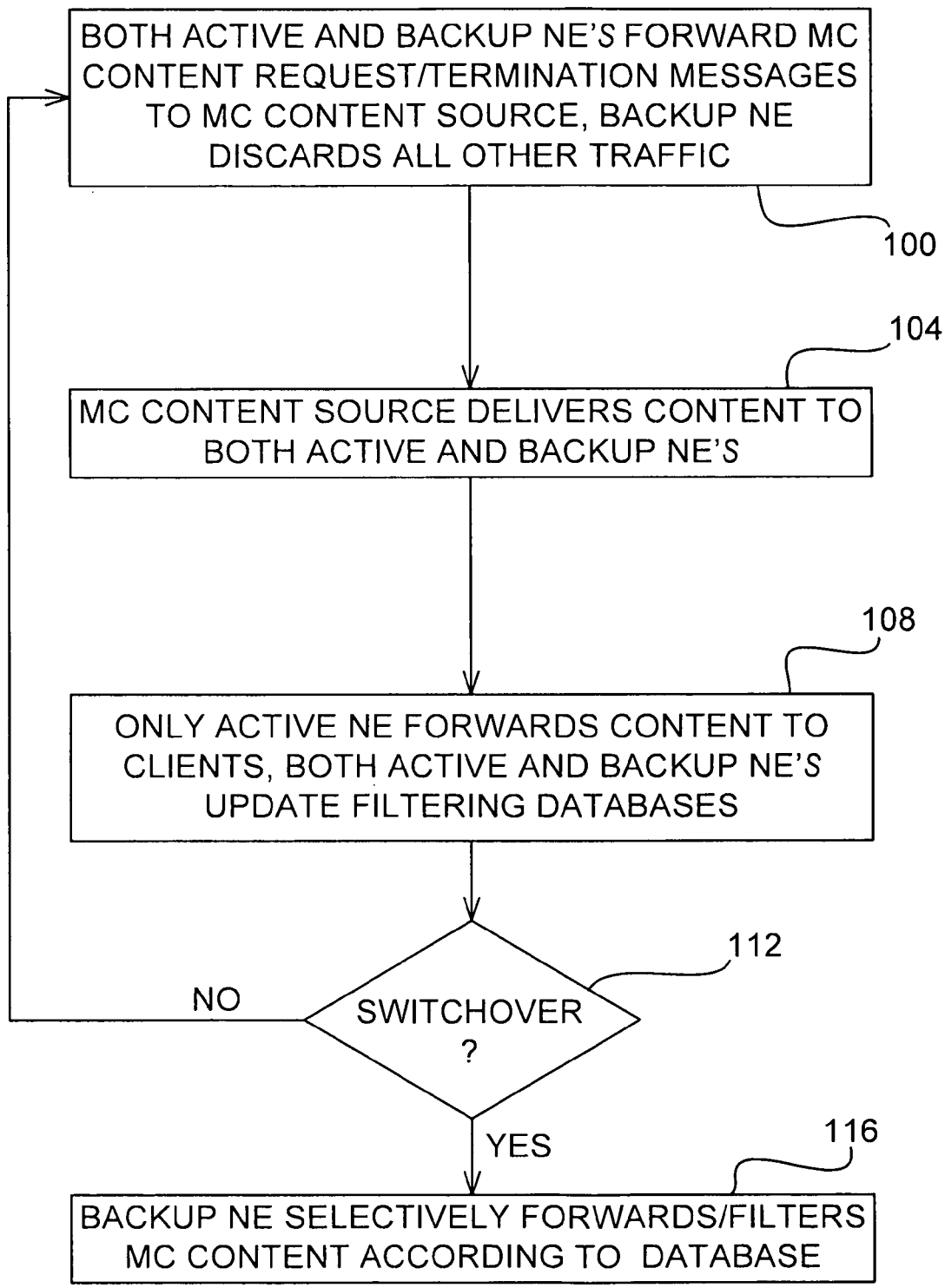
FIG. 4 is a flow chart that schematically illustrates a method for protection in a communication network, in accordance with an embodiment of the present invention.

FIG. 4 is a flow chart that schematically illustrates a method for protection in network 90, in accordance with an embodiment of the present invention. The method describes the operation of the active network element (network element 32B in FIG. 3) and the backup network element (network element 32C in FIG. 3) before and after switchover. In general, during a time period in which the backup network element is in backup mode (i.e., before switchover), it does not discard multicast content requests received from multicast clients, but rather uses the multicast content requests to update its filtering databases. In addition, the backup network element forwards the multicast content requests to the multicast sources.

As a result of this process, (1) the multicast sources forward the requested multicast streams both to the active network element and to the backup network element, and (2) the filtering databases in the backup network element are continually maintained up-to-date. The backup network element discards the multicast streams. When performing switchover, the backup network element already has up-to-date filtering databases, and is already provided with the multicast streams from the multicast sources. Thus, the backup network element can begin operation in the normal mode immediately.

The method of FIG. 4 begins with both the active and the backup network elements forwarding multicast service requests to the appropriate multicast sources, at a multicast content request forwarding step 100. In response to the requests, the multicast sources forward the requested multicast streams to both the active and the backup network elements, at a stream forwarding step 104.

The active network element forwards the multicast streams to the multicast clients, whereas the backup network element discards the multicast streams, at a client forwarding step 108. Since only the active network element forwards the multicast streams to the clients, frame duplication does not occur. The active network element may apply the selective forwarding methods described above.

Network 90 checks whether switchover is desired, at a switchover checking step 112. Switchover may be triggered, for example, by a failure occurring in the active network element, a failure in a network segment affecting the active network element, an administrator command or any other suitable event. If switchover is not triggered, the method loops back to step 100 above.

When switchover is triggered, the active network element is deactivated. The backup network element switches to the active mode and begins to forward the multicast streams instead of the previously-active network element, at a switchover step 116. The switchover time is minimal, since the multicast streams are already being forwarded to the backup network element by the multicast sources, and since the filtering databases in the backup network element are already up-to-date. Note that the protection methods of FIGS. 3 and 4 above can be used with network elements having distributed configurations, such as the configuration of FIG. 1 above. Alternatively, these methods can also be used with network elements having only a single processing unit, e.g., a single NP.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
    operating a network element, wherein the network element further comprises multiple interconnected processing units and multiple ports, wherein each processing unit is assigned to a different subset of the multiple ports of the network element, and wherein each processing unit contains a processor for processing packets communicated over the different subset of the multiple ports to which the processing unit is assigned;
    storing in each processing unit a respective list, each list indicating all of one or more multicast packet streams that are permitted for forwarding by the network element, and further indicating which of the one or more ports each multicast packet stream is permitted to be forwarded to;
    receiving from a client a request relating to reception of a given multicast packet stream;
    distributing the request among the multiple processing units within the network element, and updating the respective list in each processing unit responsively to the request; and
    selectively forwarding multicast packets associated with the given multicast packet stream by the processing units in accordance with the respective updated lists,
    wherein operating the network element comprises aggregating two or more of the ports to form a high-capacity port, and
    wherein aggregating the ports comprises setting an upper limit on a number of the multicast packet streams that are permitted for forwarding over the high-capacity port, wherein the request indicates that the given multicast packet stream is to be forwarded over the high-capacity port, and wherein updating the list comprises modifying the list to indicate that the given multicast packet stream is permitted for forwarding over the high-capacity port only when the number of the multicast packet streams that are permitted for forwarding over the high-capacity port, including the given multicast packet stream, does not exceed the upper limit.

2. The method according to claim 1, wherein storing the list, distributing the request and selectively forwarding the multicast packets are performed by dedicated hardware logic.

3. The method according to claim 1, wherein distributing the request comprises duplicating the request to produce first and second copies, forwarding the first copy to a source of the given multicast packet stream, and distributing the second copy among the multiple processing units.

4. The method according to claim 1, wherein distributing the request comprises distributing among the multiple processing units an identity of an ingress port over which the request was received at the network element, and wherein updating the list comprises causing the list to indicate that the given multicast packet stream is permitted for forwarding over the ingress port.

5. The method according to claim 1, wherein the ports forming the high-capacity port are assigned to at least two of the processing units, and wherein updating the list comprises holding respective local copies of the number of the multicast packet streams that are permitted for forwarding over the high-capacity port, updating the local copies based on the distributed request, and selectively updating the list in each of the at least two processing units based on the respective local copies.

6. The method according to claim 1, wherein the request specifies a requested action selected from a group of actions consisting of receiving the given multicast packet stream and stopping to receive the given multicast packet stream.

7. The method according to claim 1, wherein the request conforms to one of an Internet Group Management Protocol (IGMP) and a Multicast Listener Discovery (MLD) protocol.

8. A method for communication, comprising:
    operating a network element, wherein the network element further comprises multiple interconnected processing units and multiple ports, wherein each processing unit is assigned to a different subset of the multiple ports of the network element, and wherein each processing unit contains a processor for processing packets communicated over the different subset of the multiple ports to which the processing unit is assigned;

storing in each processing unit a respective list, each list indicating all of one or more multicast packet streams that are permitted for forwarding by the network element, and further indicating which of the one or more ports each multicast packet stream is permitted to be forwarded to;

receiving from a client a request relating to reception of a given multicast packet stream;

distributing the request among the multiple processing units within the network element, and updating the respective list in each processing unit responsively to the request; and selectively forwarding multicast packets associated with the given multicast packet stream by the processing units in accordance with the respective updated lists, wherein operating the network element comprises initializing a new processing unit added to the network element by:

deactivating the ports to which the new processing unit is assigned;

while the ports to which the new processing unit is assigned are deactivated, sending a multicast status request, receiving multicast membership reports sent by multicast clients in response to the multicast status request, constructing the list by the new processing unit based on the received multicast membership reports; and after constructing the list, activating the ports to which the new processing unit is assigned.

9. The method according to claim 8, wherein updating the list comprises modifying the list to indicate that the given multicast packet stream is permitted for forwarding over a given port only when a number of the multicast packet streams that are permitted for forwarding over the given port, including the given multicast packet stream, does not exceed a maximum value specified for the given port.

10. The method according to claim 8, wherein updating the list comprises tracking a use of a permission to forward a certain multicast packet stream over a certain port by monitoring requests relating to the certain multicast packet stream that are received at the network element, and removing the permission from the list responsively to determining that the permission is aged.

11. A network element, comprising:

multiple ports; and multiple interconnected processing units, wherein each processing unit is assigned to a different subset of the multiple ports of the network element, and wherein each processing unit contains a processor for processing packets communicated over the different subset of the multiple ports to which the processing unit is assigned, wherein the processing units are configured to process packets that are communicated over respective subsets of one or more of the ports, to store respective lists, each of which indicates all of one or more multicast packet streams that are permitted for forwarding by the network element and further indicates which of the one or more ports multicast packet stream is permitted to be forwarded to, to receive from a client a request relating to reception of a given multicast packet stream, and to distribute the request among the processing units within the network element so as to update the lists responsively to the distributed request and to selectively forward multicast packets associated with the given multicast packet stream in accordance with the updated lists, wherein two or more of the ports are aggregated to form a high-capacity port, and wherein an upper limit is set on a number of the multicast packet streams that are permitted for forwarding over the high-capacity port, wherein the request indicates that the given multicast packet stream is to be forwarded over the high-capacity port, and wherein the processing units are configured to update the lists to indicate that the given multicast packet stream is permitted for forwarding over the high-capacity port only when the number of the multicast packet streams that are permitted for forwarding over the high-capacity port, including the given multicast packet stream, does not exceed the upper limit.

12. The network element according to claim 11, wherein the processing units comprise dedicated hardware logic for storing the lists, distributing the request and selectively forwarding the multicast packets.

13. The network element according to claim 11, wherein a processing unit receiving the request is configured to duplicate the request to produce first and second copies, so as to forward the first copy to a source of the given multicast packet stream and distribute the second copy among the multiple processing units.

14. The network element according to claim 11, wherein a processing unit receiving the request is configured to distribute among the multiple processing units an identity of an ingress port over which the request was received, and wherein the processing units are configured to cause the respective lists to indicate that the given multicast packet stream is permitted for forwarding over the ingress port.

15. The network element according to claim 11, wherein the ports forming the high-capacity port are assigned to at least two of the processing units, and wherein the at least two processing units are configured to hold respective local copies of the number of the multicast packet streams that are permitted for forwarding over the high-capacity port, to update the local copies based on the distributed request, and to selectively update their respective lists based on the respective local copies.

16. The network element according to claim 11, wherein the processing units are configured to track a use of a permission to forward a certain multicast packet stream over a certain port by monitoring requests relating to the certain multicast packet stream that are received at the network element, and to remove the permission from the respective lists responsively to determining that the permission is aged.

17. The network element according to claim 11, wherein the request conforms to one of an Internet Group Management Protocol (IGMP) and a Multicast Listener Discovery (MLD) protocol.

18. A network element, comprising:

multiple ports; and multiple interconnected processing units, wherein each processing unit is assigned to a different subset of the multiple ports of the network element, and wherein each processing unit contains a processor for processing packets communicated over the different subset of the multiple ports to which the processing unit is assigned, wherein the processing units are configured to process packets that are communicated over respective subsets of one or more of the ports, to store respective lists, each of which indicates all of one or more multicast packet streams that are permitted for forwarding by the network element and further indicates which of the one or more ports multicast packet stream is permitted to be forwarded to, to receive from a client a request relating to reception of a given multicast packet stream, and to distribute the request among the processing units within the network element so as to update the lists responsively to the distributed request and to selectively forward multicast packets associated with the given multicast packet stream in accordance with the updated lists, wherein a new processing unit added to the network element is configured to initialize by:

deactivating the ports to which the new processing unit is assigned;

while the ports to which the new processing unit is assigned are deactivated, sending a multicast status request, receiving multicast membership reports sent by multicast clients in response to the multicast status request, constructing the list by the new processing unit based on the received multicast membership reports; and after constructing the list, activating the ports to which the new processing unit is assigned.

* * * * *